(12) United States Patent
Jung et al.

(10) Patent No.: US 8,350,977 B2
(45) Date of Patent: Jan. 8, 2013

(54) DISPLAY SUBSTRATE AND METHOD OF MANUFACTURING THE SAME

(75) Inventors: Hyung-Gi Jung, Cheonan-si (KR); Jeong-Young Lee, Asan-si (KR); Sang-Hoon Lee, Daejeon (KR)

(73) Assignee: Samsung Display Co., Ltd. (KR)

( * ) Notice: Subject to any disclaimer, the term of this patent is extended or adjusted under 35 U.S.C. 154(b) by 278 days.

(21) Appl. No.: 12/909,125

(22) Filed: Oct. 21, 2010

(65) Prior Publication Data
US 2011/0234932 A1    Sep. 29, 2011

(30) Foreign Application Priority Data
Mar. 23, 2010    (KR) .......................... 10-2010-0025530

(51) Int. Cl.
*G02F 1/1333* (2006.01)
*H01L 21/00* (2006.01)

(52) U.S. Cl. ............ 349/40; 349/139; 349/187; 438/30; 438/34; 257/E33.053

(58) Field of Classification Search .................... 349/40, 349/56, 59, 139, 50, 187; 438/30, 34; 257/E33.053
See application file for complete search history.

(56) References Cited

U.S. PATENT DOCUMENTS

| | | | |
|---|---|---|---|
| 7,642,553 B2 * | 1/2010 | Yoon et al. ...................... | 257/59 |
| 2002/0057392 A1 | 5/2002 | Ha | |
| 2008/0012797 A1 * | 1/2008 | Kil .................................. | 345/63 |
| 2008/0055505 A1 | 3/2008 | Yeh et al. | |
| 2009/0296011 A1 * | 12/2009 | Yoon et al. ...................... | 349/40 |
| 2011/0075063 A1 * | 3/2011 | Tajiri et al. ...................... | 349/42 |
| 2011/0234932 A1 * | 9/2011 | Jung et al. ...................... | 349/40 |

FOREIGN PATENT DOCUMENTS

| | | |
|---|---|---|
| JP | 2000098338 A | 4/2000 |
| JP | 2001021918 A | 1/2001 |
| JP | 2007316105 A | 12/2007 |
| KR | 1020060134730 A | 12/2006 |
| KR | 1020070098185 A | 10/2007 |
| KR | 1020080020331 A | 3/2008 |
| KR | 1020080100580 A | 11/2008 |
| KR | 1020090044645 A | 5/2009 |

* cited by examiner

*Primary Examiner* — Brian Healy
(74) *Attorney, Agent, or Firm* — Cantor Colburn LLP

(57) ABSTRACT

A display substrate includes a base substrate, a plurality of a gate line, a gate driving circuit, a starting pad and a first electrostatic dispersion portion. The gate lines are disposed at a display area of the base substrate and extend to the peripheral area. The gate driving circuit is disposed at a peripheral area of the base substrate, includes a plurality of a stage connected to the gate lines, and provides the gate lines with gate signals. The gate driving circuit is driven in response to a vertical starting signal applied to a first stage of the plurality of stages. The starting pad is disposed at the peripheral area and applies the vertical starting signal to the gate driving circuit. The first electrostatic dispersion portion is electrically connected to the starting pad. The first electrostatic dispersion portion disperses electrostatic applied to the gate driving circuit.

20 Claims, 11 Drawing Sheets

DISPLAY SUBSTRATE AND METHOD OF MANUFACTURING THE SAME

This application claims priority to Korean Patent Application No. 2010-0025530, filed on Mar. 23, 2010, and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a display substrate and a method of manufacturing the display substrate. More particularly, exemplary embodiments of the invention relate to a display substrate used in a liquid crystal display ("LCD") panel and a method of manufacturing the display substrate.

2. Description of the Related Art

Generally, an LCD panel includes a display substrate, an opposite substrate opposite to the display substrate and a liquid crystal layer interposed between the display substrate and the opposite substrate. The display substrate includes a display area, and a peripheral area surrounding the display area. A plurality of signal lines, and a plurality of pixel parts electrically connected to the signal lines are formed on the display area. A driving circuit providing the signal lines with a driving signal is disposed on the peripheral area.

When the display substrate is manufactured, a test process which tests for defects of the signal lines is performed. In order to carry out the test process, a plurality of test pads is formed on a mother substrate of the display substrate. Test signals are respectively applied to the gate lines and the data lines through the test pads to test for defects of the gate lines and the data lines.

However, when the test process is performed, electrostatic is applied to the signal lines and the driving circuit through the test pads, so that the signal lines and the driving circuit formed on the display substrate may be deteriorated. The electrostatic may decrease a manufacturing yield of the display substrate and causes defects of the display substrate.

BRIEF SUMMARY OF THE INVENTION

Exemplary embodiments of the invention provide a display substrate capable of preventing defects due to electrostatic, such as during a test process.

Exemplary embodiments of the invention also provide a method of manufacturing the above-mentioned display substrate.

According to an exemplary embodiment of the invention, a display substrate includes a base substrate, a plurality of a gate line, a gate driving circuit, a starting pad and a first electrostatic dispersion portion. The base substrate includes a display area in which a plurality of pixel parts is disposed, and a peripheral area surrounding the display area. The gate lines are disposed at the display area and are extended to the peripheral area. The gate driving circuit is disposed at the peripheral area and includes a plurality of a stage connected to the gate lines, to provide the gate lines with gate signals. The gate driving circuit is driven in response to a vertical starting signal applied to a first stage of the plurality of stages. The starting pad is disposed at the peripheral area to apply the vertical starting signal to the gate driving circuit. The first electrostatic dispersion portion is electrically connected to the starting pad. The first electrostatic dispersion portion disperses electrostatic applied to the gate driving circuit.

According to another exemplary embodiment of the invention, a display substrate includes a base substrate, a gate line, a gate driving circuit, a gate pad electrode, an output pad electrode and a first electrostatic prevention pad electrode. The base substrate includes a display area in which a plurality of pixel parts is disposed, and a peripheral area surrounding the display area. The gate line is disposed at the display area and extended to the peripheral area. The gate driving circuit is disposed at the peripheral area to provide the gate line with a gate signal. The gate pad electrode is disposed at the peripheral area to be connected to an end portion of the gate line extended at the peripheral area. The output pad electrode is disposed at the peripheral area to be electrically connected to an output terminal of the gate driving circuit. The first electrostatic prevention pad electrode is in a same layer as the output pad electrode, and disposed between the output pad electrode and the gate pad electrode in a plan view. The first electrostatic prevention pad prevents electrostatic from being applied to the gate line.

According to still another exemplary embodiment of the invention, there is provided a method of manufacturing a display substrate. In the method, a first metal pattern is formed, which includes a gate line formed on a display area of a base substrate and a gate pad electrode formed on a peripheral area surrounding the display area to be connected to a first end portion of the gate line. A second metal pattern is formed, which includes a data line formed on the display area of the base substrate in which the first metal pattern is formed, an output pad electrode connected to an output terminal of a gate driving circuit formed on the peripheral area, and a first electrostatic prevention pad electrode formed between the output pad electrode and the gate pad electrode. A transparent electrode pattern is formed, which includes a pixel electrode electrically connected to the gate line and the data line on the base substrate in which the second metal pattern is formed.

According to a display substrate and a method of manufacturing the display substrate, application of electrostatic to the gate driving circuit from a starting pad applying a vertical starting signal, such as during a test process, may be reduced or effectively prevented. Moreover, the application of the electrostatic to a gate driving circuit from gate lines, may be reduced or effectively prevented. Thus, a driving reliability of the display substrate may be enhanced.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
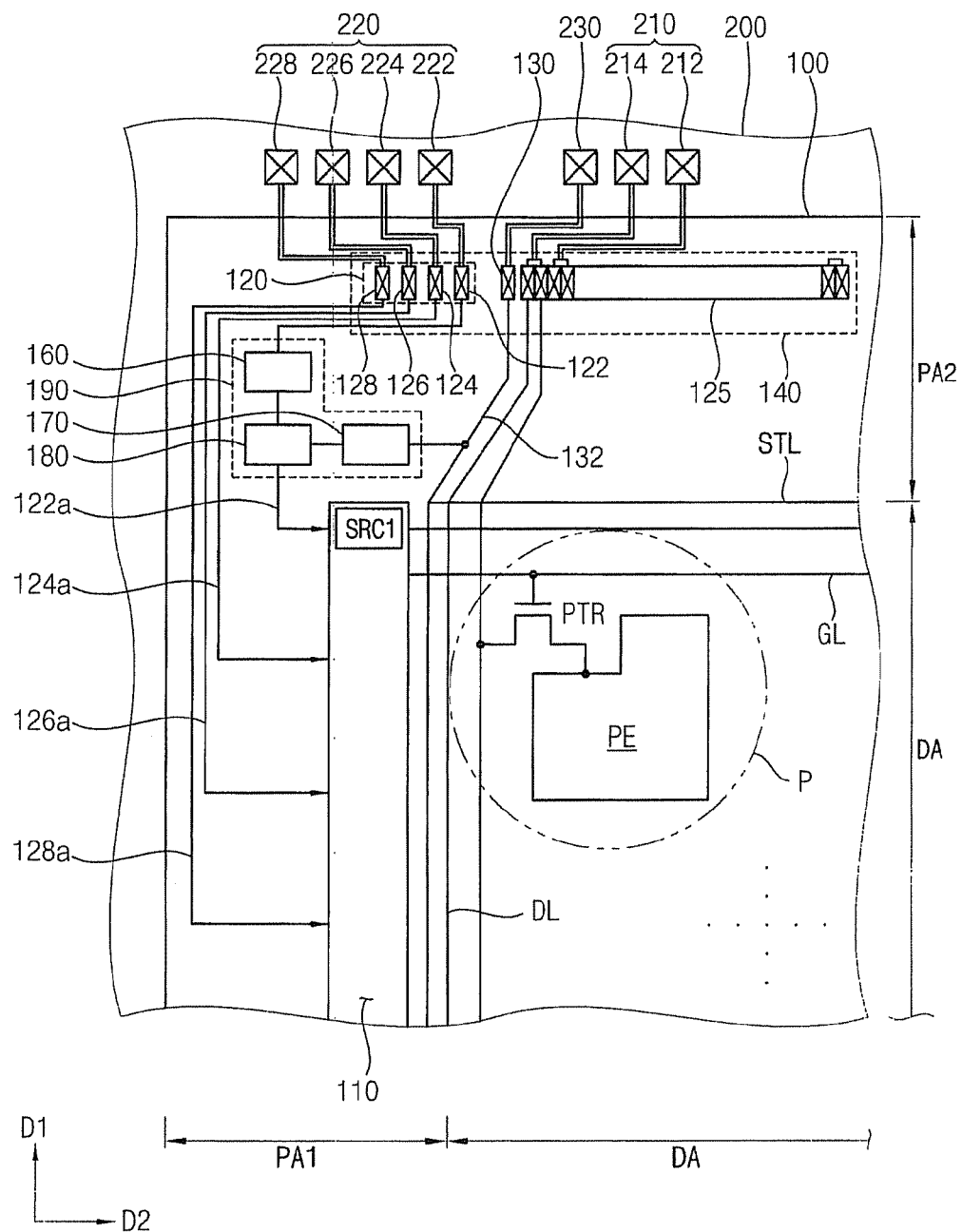
FIG. 1 is a plan view illustrating an exemplary embodiment of a display substrate, according to the invention.

The invention is described more fully hereinafter with reference to the accompanying drawings, in which exemplary embodiments of the invention are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, connected may refer to elements being physically and/or electrically connected to each other. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a plan view illustrating an exemplary embodiment of a display substrate, according to the invention.

Referring to FIG. 1, the display substrate 100 according to the exemplary embodiment is disposed on a mother substrate 200. The display substrate 100 includes a display area DA, and a peripheral area PA surrounding the display area DA. The peripheral area PA may include areas of the display substrate 100 except for areas of the display area DA. A plurality of pixel parts P and a plurality of signal lines are disposed on the display area DA.

The signal lines include a plurality of a data line DL, a plurality of a gate line GL and a plurality of a storage line STL. The data lines DL longitudinally extend in a first direction D1. The gate lines GL longitudinally extend in a second direction D2 crossing the first direction D1. The storage lines STL extend in the second direction D2. Each of the pixel part P includes a switching element PTR electrically and/or physically connected to a gate line GL and a data line DL, and a pixel electrode PE electrically and/or physically connected to the switching element PTR.

The peripheral area PA includes a first peripheral area PA1 adjacent to a first portion of the gate lines GL, and a second peripheral area PA2 adjacent to a first portion of the data lines DL.

A gate driving circuit 110 is disposed on the first peripheral area PA1, and is electrically and/or physically connected to the first portion of the gate lines GL to apply gate signals to the gate lines GL. The gate driving circuit 110 includes a plurality of a stage electrically and/or physically connected one after another, to each other. When a vertical starting signal is applied to a first stage SRC1 of the stages, the gate driving circuit 110 is activated. Each of the stages includes a plurality of switching elements. In an exemplary embodiment, the switching elements of the stages may be formed through an identical process to that for forming the switching element PTR disposed at the display area DA.

A signal pad part 140 and an electrostatic protection circuit 190 are disposed on the second peripheral area PA2.

The signal pad part 140 may include a gate pad part 120, a data pad part 125 and a storage pad part 130.

The gate pad part 120 delivers a driving signal from the gate driving circuit 110 to a corresponding gate line GL. The gate pad part 120 may include a starting pad 122 applying a vertical starting signal STV to the display area DA, a power pad 124 applying a power signal VSS to the display area DA, a first clock pad 126 applying a first clock signal CK to the display area DA and a second clock pad 128 applying a second clock signal CKB to the display area DA.

The starting pad 122 applies the vertical starting signal STV to the first stage SRC1 of the data driving circuit 110. The starting pad 122 is electrically and/or physically connected to the first stage SRC1 through a vertical starting line 122a disposed at the first peripheral area PA1. Although not shown in FIG. 1, the vertical starting line 122a may be extended to a last stage (not shown) of the gate driving circuit 110 to deliver the vertical starting signal STV to the last stage.

The power pad 124 is electrically and/or physically connected to a power line 124a disposed at the first peripheral area PA1, to deliver the power signal VSS to the power line 124a. The power line 124a is electrically and/or physically connected to the gate driving circuit 110.

The clock pad 126 is electrically and/or physically connected to a first clock line 126a disposed at the first peripheral area PA1, to deliver the first clock signal CK to the first clock line 126a. The first clock line 126a is electrically and/or physically connected to the gate driving circuit 110.

The second clock pad 128 is electrically and/or physically connected to a second clock line 128a disposed at the first peripheral area PA1 to deliver the second clock signal CKB to the second clock line 128a. The second clock line 128a is electrically and/or physically connected to the gate driving circuit 110.

The data pad part 125 includes a plurality of pads applying data signals to the data lines DL.

The storage pad part 130 is electrically and/or physically connected to a storage connection line 132 disposed at the first peripheral area PA1, to deliver a common voltage VCOM to the storage connection line 132. The storage connection line 132 is extended in a direction crossing the storage lines STL to be electrically and/or physically connected to the storage lines STL.

The mother substrate 200 may include a test pad part. In one exemplary embodiment, for example, the test pad part may include a data test part 210, a gate test part 220 and a storage test part 230.

The data test part 210 provides the data lines DL with a test signal in order to test for defects of the data lines DL. The data test part 210 may include a first test pad 212 and a second test pad 214. In the illustrated exemplary embodiment, the data test part 210 is disclosed as an example of a 2D (two data lines) inspection method. Alternatively, the number of test pads may be varied in accordance with a data inspection method.

According to the 2D inspection method, the data pads of the data pad part 125 may be divided into a first group and a second group. The data test part 210 includes a first test pad 212 and a second test pad 214. The first test pad 212 is electrically and/or physically connected to data pads of the first group, and the second test pad 214 is electrically and/or physically connected to data pads of the second group. The first group may be odd-numbered data pads, and the second group may be even-numbered data pads.

The gate test part 220 provides the gate lines GL with a test signal in order to test for defects of the gate lines GL. The gate test part 220 includes a starting test pad 222 for testing the vertical starting signal STV, a power test pad 224 for testing the power signal VSS, a first clock test pad 226 for testing the first clock signal CK and a second clock pad 228 for testing the second clock signal CKB. The starting test pad 222 is electrically and/or physically connected to the starting pad 122, and the power test pad 224 is electrically and/or physically connected to the power pad 124. The first clock test pad 226 is electrically and/or physically connected to the first clock pad 126, and the second clock test pad 228 is electrically and/or physically connected to the second clock pad 128.

The storage test part 230 provides the storage lines STL with a test signal in order to test for defects of the storage lines STL. The storage test part 230 is electrically and/or physically connected to the storage pad part 130.

After a test for the gate lines GL, the data lines DL and the storage lines STL is completed, the display substrate 100 is cut from the mother substrate 200.

The electrostatic protection circuit 190 includes a first electrostatic dispersion portion 160, a second electrostatic dispersion portion 170 and a third electrostatic dispersion portion 180.

The first electrostatic dispersion portion 160 is disposed between the starting pad 122 and the first stage SRC1 of the gate driving circuit 110. The first electrostatic dispersion portion 160 disperses electrostatic of a negative polarity (−) and electrostatic of a positive polarity (+) that are applied to the first stage SRC1.

The second electrostatic dispersion portion 170 is disposed between the storage pad part 130 and the storage connection line 132. The second electrostatic dispersion portion 170 disperses electrostatic of a negative polarity (−) and electrostatic of a positive polarity (+) that are applied to the storage connection line 132.

The third electrostatic dispersion portion 180 is electrically and/or physically connected to the first and second electrostatic dispersion portions 160 and 170 to disperse the electrostatic of a negative polarity (−) and electrostatic of a positive polarity (+) that are applied to the first and second electrostatic dispersion portions 160 and 170 in multiple paths.

Figure 2:
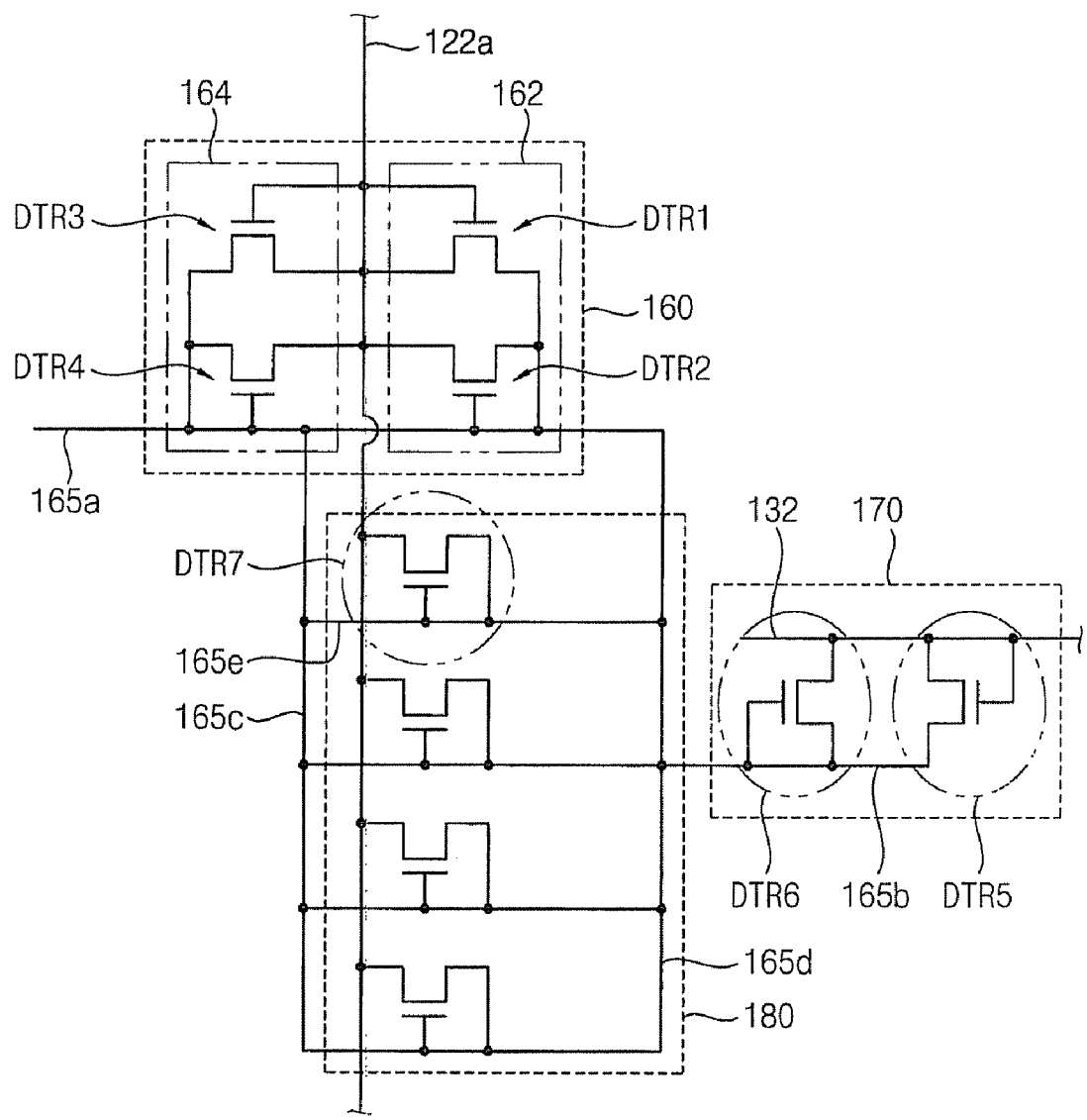
FIG. 2 is an equivalent circuit diagram of the electrostatic protection circuit of FIG. 1.
Figure 3:
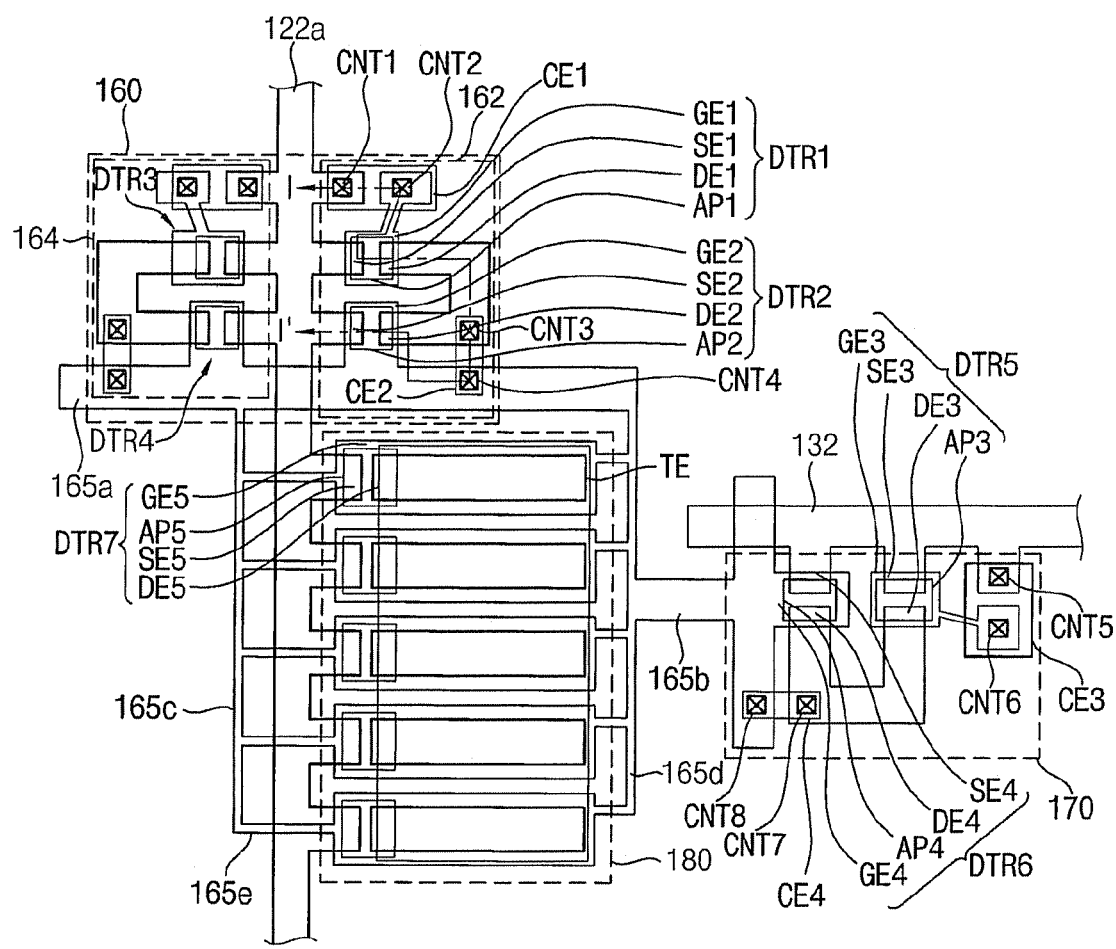
FIG. 3 is a plan view showing the electrostatic protection circuit of FIG. 1.

FIG. 2 is an equivalent circuit diagram of the electrostatic protection circuit of FIG. 1. FIG. 3 is a plan view showing the electrostatic protection circuit of FIG. 1.

Referring to FIGS. 1 and 3, the first electrostatic dispersion portion 160 includes a first electrostatic diode part 162 and a second electrostatic diode part 164. The first electrostatic diode part 162 and the second electrostatic diode part 164 are electrically and/or physically connected to the vertical starting line 122a in a back-to-back structure relative to the vertical starting line 122a.

The first electrostatic diode part 162 is electrically and/or physically connected to the vertical starting line 122a and a first electrostatic dispersion line 165a. The first electrostatic dispersion line 165a is extended in a direction crossing the vertical starting line 122a.

The first electrostatic diode part 162 includes a first diode DTR1 and a second diode DTR2.

The first diode DTR1 includes a first input electrode SE1, a first control electrode GE1, a first output electrode DE1 and a first active pattern AP1. The first input electrode SE1 is electrically and/or physically connected to the vertical starting line 122a. The first input electrode SE1 and the vertical starting line 122a are collectively a single unitary indivisible member, such that the first input electrode SE1 is considered electrically and/or physically connected to the vertical starting line 122a. The first control electrode GE1 is electrically and/or physically connected to the vertical starting line 122a through a first connection electrode CE1. The first connection electrode CE1 is electrically and/or physically connected to the vertical starting line 122a through a first contact hole CNT1, and electrically and/or physically connected to the first control electrode GE1 through a second contact hole CNT2.

The first output electrode DE1 of the first diode DTR1 is electrically and/or physically connected to the first electrostatic dispersion line 165a through a second connection electrode CE2. The second connection electrode CE2 is electrically and/or physically connected to the first output electrode DE1 through a third contact hole CNT3, and is electrically and/or physically connected to the first electrostatic dispersion line 165a through a fourth contact hole CNT4. The first active pattern AP1 is overlapped with the first control electrode GE1 by interposing a gate insulation layer (not shown) between the first active pattern AP1 the first control electrode GE1. The first input electrode SE1 and the first output electrode DE1 are spaced apart from each other on the first active pattern AP1, in the plan view.

The second diode DTR2 includes a second input electrode SE2, a second control electrode GE2, a second output electrode DE2 and a second active pattern AP2. The second input electrode SE2 is electrically and/or physically connected to the vertical starting line 122a. The second input electrode SE2 and the vertical starting line 122a are collectively a single unitary indivisible member, such that the second input electrode SE2 is considered electrically and/or physically connected to the vertical starting line 122a. The second control electrode GE2 is electrically and/or physically connected to the first electrostatic dispersion line 165a. The second control electrode GE2 and the first electrostatic dispersion line 165a are collectively a single unitary indivisible member, such that the second control electrode GE2 is considered electrically and/or physically connected to the first electrostatic dispersion line 165a. The second output electrode DE2 and the first output electrode DE1 are collectively a single unitary indivisible member, such that the second output electrode DE2 is considered electrically and/or physically connected to the first output electrode DE1.

The second output electrode DE2 of the second diode DTR2 is electrically and/or physically connected to the first electrostatic dispersion line 165a through the second connection electrode CE2. The second active pattern AP2 is overlapped with the second control electrode GE2 by interposing the gate insulation layer between the second active pattern AP2 and the second control electrode GE2. The second input electrode SE2 and the second output electrode DE2 are spaced apart from each other on the second active pattern AP2, in the plan view.

The electrostatic diode part 164 is electrically and/or physically connected to the vertical starting line 122a in parallel with the first electrostatic diode part 162. The second electrostatic diode part 164 includes a third diode DTR3 and a fourth diode DTR4. The third diode DTR3 is substantially identical to the first diode DTR1, and the fourth diode DTR4 is substantially identical to the second diode DTR2, so that any repetitive detailed explanation may be hereinafter be omitted.

The second electrostatic dispersion portion 170 is electrically and/or physically connected to the storage connection line 132 and the second electrostatic dispersion line 165b. A portion of the second electrostatic dispersion line 165b may be extended in a direction crossing the storage connection line 132.

The second electrostatic dispersion portion 170 includes a fifth diode DTR5 and a sixth diode DTR6.

The fifth diode DTR5 includes a third input electrode SE3, a third control electrode GE3, a third output electrode DE3 and a third active pattern AP3. The third input electrode SE3 is electrically and/or physically connected to the storage connection line 132. The third input electrode SE3 and the storage connection line 132 are collectively a single unitary indivisible member, such that the third input electrode SE3 is considered electrically and/or physically connected to the storage connection line 132. The third control electrode GE3 is electrically and/or physically connected to the storage connection line 132 through a third connection electrode CE3. The third connection electrode CE3 is electrically and/or physically connected to the storage connection line 132 through a fifth contact hole CNT5, and is electrically and/or physically connected to the third control electrode GE3 through a sixth contact hole CNT6.

The third output electrode DE3 of the fifth diode DTR5 is electrically and/or physically connected to the second electrostatic dispersion line 165b through a fourth connection electrode CE4. The fourth connection electrode CE4 is electrically and/or physically connected to the third and a fourth output electrode DE3 and DE4 through a seventh contact hole CNT7, and is electrically and/or physically connected to the second electrostatic dispersion line 165b through an eighth contact hole CNT8. The third active pattern AP3 is overlapped with the third control electrode GE3 by interposing the gate insulation layer between the third active pattern AP3 and the third control electrode GE3.

The sixth diode DTR6 includes a fourth input electrode SE4, a fourth control electrode GE4, a fourth output electrode DE4 and a fourth active pattern AP4. The fourth input electrode SE4 is electrically and/or physically connected to the storage connection line 132. The fourth input electrode SE4 and the storage connection line 132 are collectively a single unitary indivisible member, such that the fourth input electrode SE4 is considered electrically and/or physically connected to the storage connection line 132. The fourth control electrode GE4 is electrically and/or physically connected to the second electrostatic dispersion line 165b. The fourth control electrode GE4 and the second electrostatic dispersion line 165b are collectively a single unitary indivisible member, such that the fourth control electrode GE4 is considered electrically and/or physically connected to the second electrostatic dispersion line 165b. The fourth output electrode DE4 and the third output electrode DE3 are collectively a single unitary indivisible member, such that the fourth output electrode DE4 is considered electrically and/or physically connected to the third output electrode DE3.

The fourth output electrode DE4 of the sixth diode DTR6 is electrically and/or physically connected to the second electrostatic dispersion line 165b through the fourth connection electrode CE4. The fourth active pattern AP4 is overlapped with the fourth control electrode GE4 by interposing the gate insulation layer between the fourth active pattern AP4 and the fourth control electrode GE4. The fourth input electrode SE4 and the fourth output electrode DE4 are spaced apart from each other on the fourth active pattern AP4, in the plan view.

In the illustrated exemplary embodiment, the second electrostatic dispersion portion 170 is disposed at a first end portion of the storage connection line 132. However, the invention is not limited to the illustrated exemplary embodiment. Alternatively, the second electrostatic dispersion portion 170 may be configured in a back-to-back structure.

The display substrate 100 may further include a first sub-electrostatic dispersion line 165c, a second sub-electrostatic dispersion line 165d and a third sub-electrostatic dispersion line 165e. The first sub-electrostatic dispersion line 165c is branched from the first electrostatic dispersion line 165a to be extended in parallel with the vertical starting line 122a. The second sub-electrostatic dispersion line 165d is extended from a second end portion opposite to a first end portion of the first electrostatic dispersion line 165a in which the first sub-electrostatic dispersion line 165c is branched. The second sub-electrostatic dispersion line 165d is electrically and/or physically connected to the second electrostatic dispersion line 165b. The third sub-electrostatic dispersion line 165e is extended in a direction crossing the first and second sub-electrostatic dispersion lines 165c and 165d, and is electrically and/or physically connected to the first and second electrostatic dispersion lines 165a and 165b.

The first electrostatic dispersion line 165a, the second electrostatic dispersion line 165b, the first sub-electrostatic dispersion line 165c, the second sub-electrostatic dispersion line 165d and the third sub-electrostatic dispersion line 165e collectively form a single unitary indivisible dispersion line, as illustrated in FIGS. 2 and 3.

The third electrostatic dispersion portion 180 includes a plurality of seventh diodes DTR7.

Each of the seventh diode DTR7 includes a fifth input electrode SE5, a fifth control electrode GE5, a fifth output electrode DE5 and a fifth active pattern AP5. The fifth input electrode SE5 is partially overlapped with a portion of the third sub-electrostatic dispersion line 165e, and is electrically and/or physically connected to the vertical starting line 122a. The fifth input electrode SE5 and the vertical starting line 122a are collectively a single unitary indivisible member, such that the fifth input electrode SE5 is considered electrically and/or physically connected to the vertical starting line 122a. The fifth output electrode DE5 is overlapped with the third sub-electrostatic dispersion line 165e and a transparent electrode TE. A portion of the third sub-electrostatic dispersion line 165e overlapped with the fifth input electrode SE5 and the fifth output electrode DE5, is the fifth control electrode GE5. The fifth active pattern AP5 is overlapped with the fifth control electrode GE5 by interposing the gate insulation layer between the fifth active pattern AP5 and the fifth control electrode GE5. The fifth input electrode SE5 is spaced apart from the fifth output electrode DE5 on the fifth active pattern AP5 in the plan view. The third sub-electrostatic dispersion line 165e and the fifth output electrode DE5 are overlapped with each other by interposing the gate insulation layer between the third sub-electrostatic dispersion line 165e and the fifth output electrode DE5. The fifth output electrode DE5 and the transparent electrode TE are overlapped with each other by interposing a protection insulation (not shown) between the fifth output electrode DE5 and the transparent electrode TE.

Electrostatic applied to the vertical starting line 122a, such as during a test process, is dispersed to the first electrostatic diode part 162 and the second electrostatic diode part 164. Electrostatic applied to the first and second electrostatic diode parts 162 and 164 is dispersed in multiple paths by the third sub-electrostatic dispersion lines 165e, so that an electric energy is consumed so that an energy level may be decreased.

Moreover, electrostatic applied to the storage connection line 132, such as during a test process, is dispersed by the fifth and sixth diodes DTR5 and DTR6 of the second electrostatic dispersion portion 170. Electrostatic applied to the second electrostatic dispersion line 165b is dispersed in multiple paths by the third sub-electrostatic dispersion lines 165e, so that an energy level may be decreased.

Figure 4A:
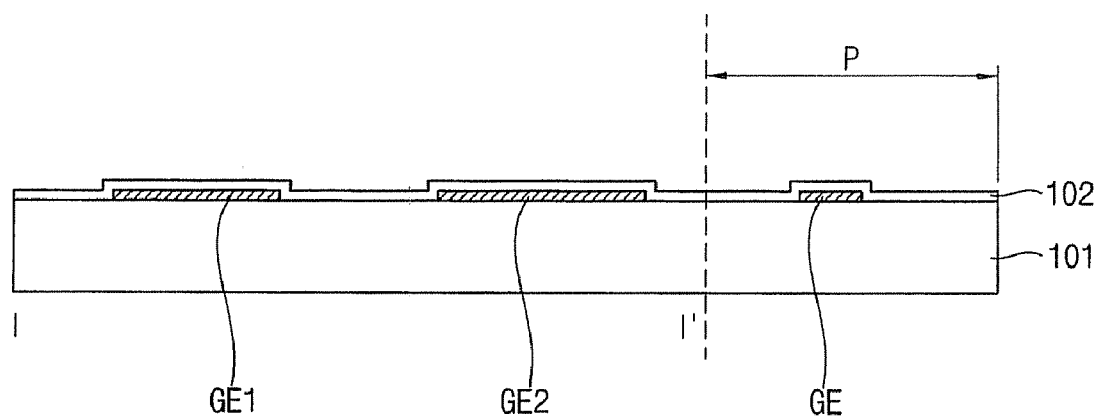
FIGS. 4A, 4B and 4C are cross-sectional views along line I-I' in FIG. 3 and within the pixel part of FIG. 1, explaining an exemplary embodiment of a method of manufacturing the display substrate of FIG. 3.
Figure 4B:
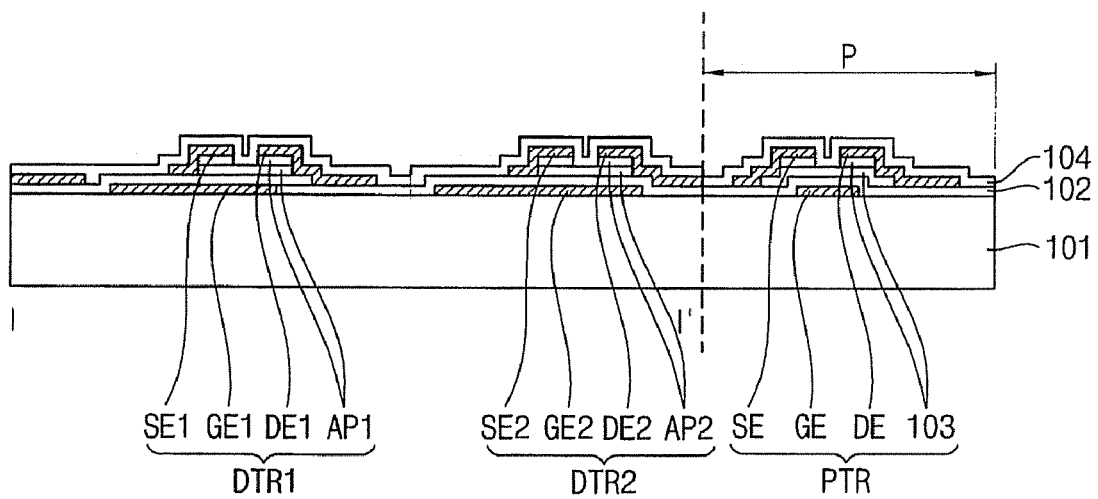
Figure 4C:
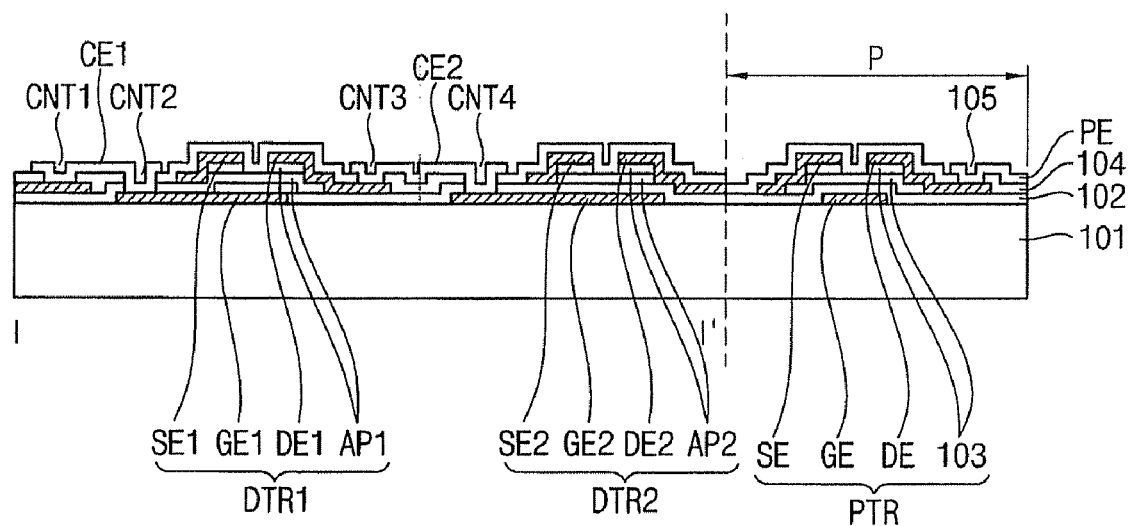

FIGS. 4A, 4B and 4C are cross-sectional views explaining an exemplary embodiment of a method of manufacturing the display substrate, including the electrostatic dispersion portion, as shown in FIG. 3.

Referring to FIGS. 3 and 4A, the display substrate 100 includes a base substrate 101. A first metal layer is formed on the base substrate 101, and the first metal layer is patterned to form a first metal pattern. The first metal pattern includes the gate lines GL disposed on the display area DA, the storage lines STL disposed on the display area DA and a gate electrode GE of a switching element PTR included in the pixel part P. Moreover, the first metal pattern includes a first control electrode GE1 of the first diode DTR1, a second control electrode GE2 of the second diode DTR2 and the first electrostatic dispersion line 165a.

A gate insulation layer 102 is formed on the base substrate 101, on which the first metal pattern is formed.

Referring to FIGS. 3 and 4B, a semiconductor layer (not shown) is formed on the base substrate 101 in which the gate insulation layer 102 is formed, and the semiconductor layer is patterned to form an active pattern 103 of the switching element PTR, a first active pattern AP1 of the first diode DTR1 and a second active pattern AP2 of the second diode DTR2. The active patterns 103, AP1 and AP2 may be configured in a double-layered structure including an active layer and an ohmic contact layer.

A second metal layer is formed on the base substrate 101 in which the active patterns 103, AP1 and AP2 are formed, and the second metal layer is patterned to form a second metal pattern. The second metal pattern includes the data lines DL disposed on the display area DA, and a source electrode SE and a drain electrode DE of the switching element PTR. Moreover, the second metal pattern includes the first input electrode SE1 and first output electrode DE1 of the first diode DTR1 and the second input electrode SE2 and second output electrode DE2 of the second diode DTR2.

A protection insulation layer 104 is formed on the base substrate 101 in which the second metal pattern is formed.

Referring to FIGS. 3 and 4C, the protection insulation layer 104 is etched to form a contact hole 105 exposing the drain electrode DE of the switching element PTR, the first contact hole CNT1 exposing the vertical starting line 122a, the second contact hole CNT2 exposing a connection electrode and/or physically connected to the first control electrode GE1, the third contact hole CNT3 exposing the first and second output electrodes DE1 and DE2, and the fourth contact hole CNT4 exposing the first electrostatic dispersion line 165a.

A transparent conductive layer is formed on the base substrate 101 through which the contact holes 105, CNT1, CNT2, CNT3 and CNT4 are formed, and the transparent conductive layer is patterned to form a transparent electrode pattern. The transparent electrode pattern includes a pixel electrode PE included in the pixel part P, and the first and second connection electrodes CE1 and CE2.

According to the illustrated exemplary embodiment in FIGS. 1-4C, electrostatic applied to the vertical starting line 122a and the storage connection line 132, such as during a test process, is dispersed by the first to third electrostatic dispersion portions 160, 170 and 180, so that deterioration of the gate driving circuit 110 and the storage lines STL due to the electrostatic may be reduced or effectively prevented.

Figure 5:
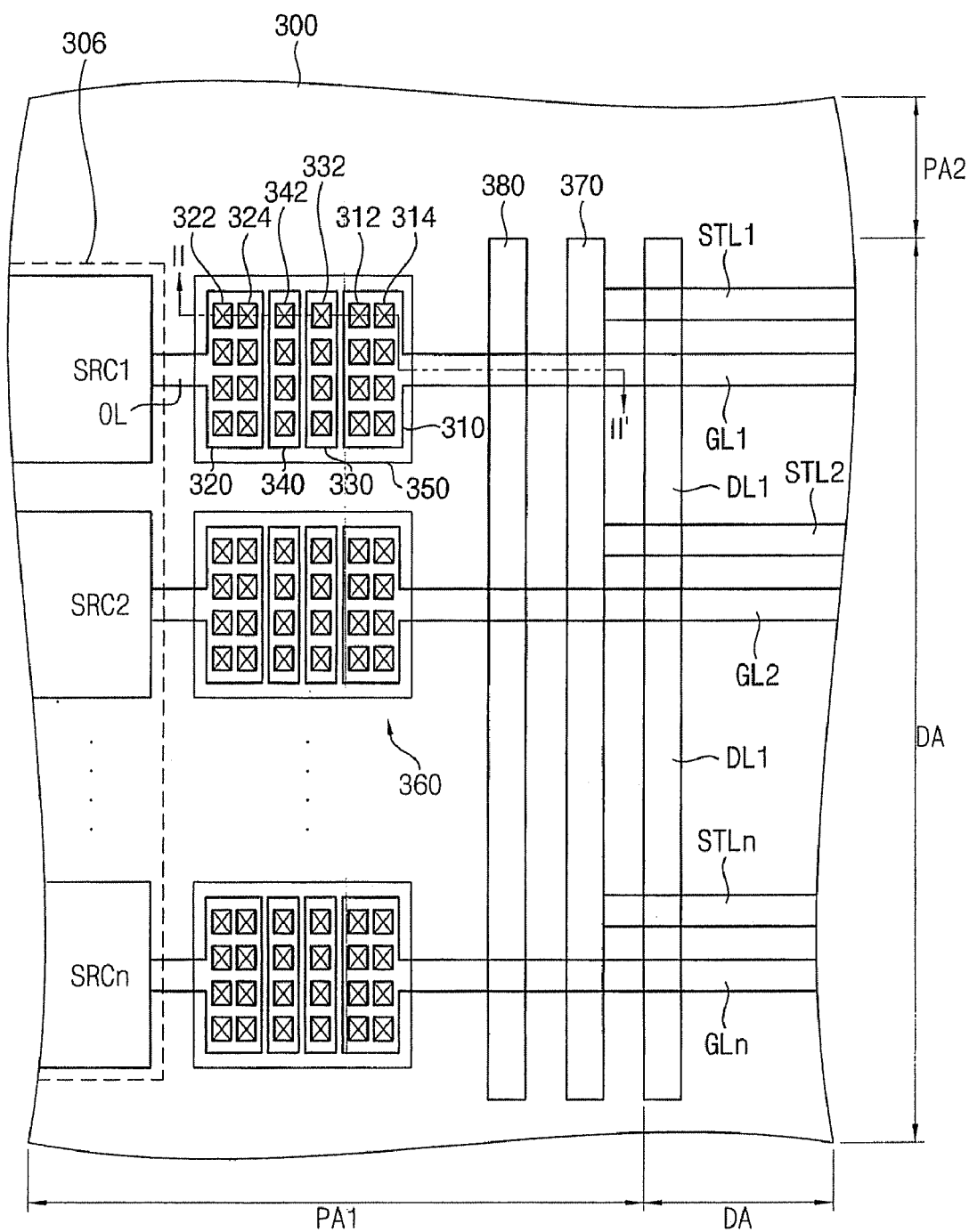
FIG. 5 is a plan view illustrating another exemplary embodiment of a display substrate, according to the invention.

FIG. 5 is a plan view illustrating another exemplary embodiment of a display substrate, according to the invention.

Referring to FIG. 5, the display substrate 300 according to the exemplary embodiment includes a display area DA, and a peripheral area PA surrounding the display area DA. A plurality of data lines DL1 to DLm, a plurality of gate lines GL1 to GLn and a plurality of storage lines STL1 to STL2 are disposed on the display area DA. In this exemplary embodiment, 'm' and 'n' are natural numbers. In FIG. 4, a first data line DL1 of the data lines DL1 to DLm is shown. A plurality of pixel parts (not shown) is disposed on the display area DA. Each of the pixel parts P includes a switching element PTR and a pixel electrode PE and/or physically connected to the switching element PTR, as shown in FIG. 1.

The peripheral area PA includes a first peripheral area PA1 adjacent to first end portions of the gate lines GL1 to GLn and a second peripheral area PA2 adjacent to first end portions of the data lines DL1 to DLm.

A gate driving circuit 306 and a plurality of a pad part 360 are disposed on the first peripheral area PA1. The gate driving circuit 306 includes a plurality of stages SRC1 to SRCn, wherein 'n' is a natural number. Each of the stages includes a plurality of switching elements. In an exemplary embodiment, the switching elements of the states may be formed through an identical process to that for forming the switching element PTR formed at the display area DA.

The pad part 360 includes a gate pad electrode 310, an output pad electrode 320, a first electrostatic prevention pad electrode 330, a second electrostatic prevention pad electrode 340 and a connection pad electrode 350.

The gate pad electrode 310 is electrically and/or physically connected to first portions of the gate lines GL1 to GLn that are extended in the first peripheral area PA1.

The output pad electrode 320 is electrically and/or physically connected to an output line OL extended from output portions of each of the stages SRC1 to SRCn.

The first electrostatic prevention pad electrode 330 is disposed between the gate pad electrode 310 and the output pad electrode 320, in a plan view. The first electrostatic prevention pad electrode 330 is disposed in a same layer as the output pad electrode 320.

The second electrostatic prevention pad electrode 340 is disposed between the output pad electrode 320 and the first electrostatic prevention pad electrode 330, in the plan view. The second electrostatic prevention pad electrode 340 is disposed in a same layer as the gate pad electrode 310.

The connection pad electrode 350 is electrically and/or physically connected to the pad electrodes 310, 320, 330 and 340 through a plurality of contact holes 312, 314, 322, 324, 332 and 342, respectively. The plurality of contact holes 312, 314, 322, 324, 332 and 342 are extended completely through the gate pad electrode 310, the output pad electrode 320, and the first and second electrostatic prevention pad electrodes 330 and 340, respectively. The connection pad electrode 350 is disposed to cover (e.g., overlap in a plan view) the pad electrodes 310, 320, 330 and 340. The connection pad electrode 350 may include an optically transparent and electrically conductive layer.

A stepped difference may be formed between the gate pad electrode 310 and the output pad electrode 320 due to the first and second electrostatic prevention pad electrodes 330 and 340. In the illustrated embodiment, for example, a first stepped difference is formed between the gate pad electrode 310 and the first electrostatic prevention pad electrode 330, and a second stepped difference is formed between the first electrostatic prevention pad electrode 330 and the second electrostatic prevention pad electrode 340. A third stepped difference is formed between the second electrostatic prevention pad electrode 340 and the output pad electrode 320. Electrostatic applied to the gate lines GL1 to GLn in a manufacturing process of the display substrate 300 is consumed by the stepped differences generated at the pad part 360, so that an energy level is decreased. Thus, the application of electrostatic to the gate driving circuit 306 from the gate lines GL1 to GLn may be reduced or effectively prevented.

The display substrate 300 may include a storage connection line 370 and a third electrostatic prevention pad electrode 380.

The storage connection line 370 is disposed extended in a direction crossing the storage lines STL1 to STLn disposed on the display area DA, and is electrically and/or physically connected to an end portion of the storage lines STL1 to STLn extended in the first peripheral area PA1. The storage connection line 370 delivers a common voltage VCOM to the storage lines STL1 to STLn.

The third electrostatic prevention pad electrode 380 is disposed between the pad parts 360 and the storage connection line 370, in the plan view. The third electrostatic prevention pad electrode 380 is disposed to cross the gate lines GL1 to GLn extended in the first peripheral area PA1, and is electrically floated from the gate lines GL1 to GLn. That is, the third electrostatic prevention pad electrode 380 and the gate lines GL1 to GLn include different materials and/or are disposed on different layers. The third electrostatic prevention pad electrode 380 receives a ground voltage. The third electrostatic prevention pad electrode 380 provides a discharging path of electrostatic applied to the gate lines GL1 to GLn, so that application of the electrostatic to the pad part 360 may be reduced or effectively prevented.

Although not shown in FIG. 5, the display substrate 300 may further include a signal pad part which provides the gate driving circuit 306, the data lines DL1 to DLm and the storage lines STL1 to STLn with driving signals, and an electrostatic protection circuit capable of reducing or effectively preventing electrostatic from being applied to the gate driving circuit 306 and the storage lines STL1 to STLn, as shown in FIG. 1.

Figure 6A:
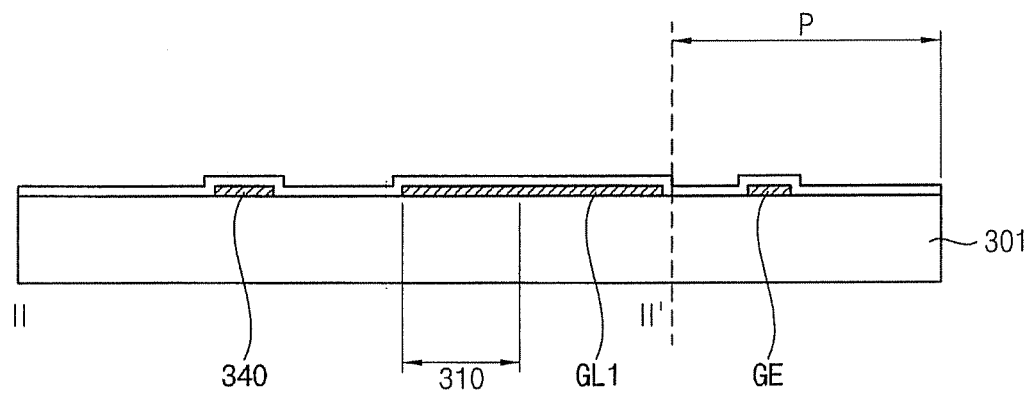
FIGS. 6A, 6B and 6C are cross-sectional views along line II-II' in FIG. 5 and within a pixel part, explaining an exemplary embodiment of a method of manufacturing the display substrate of FIG. 5.
Figure 6B:
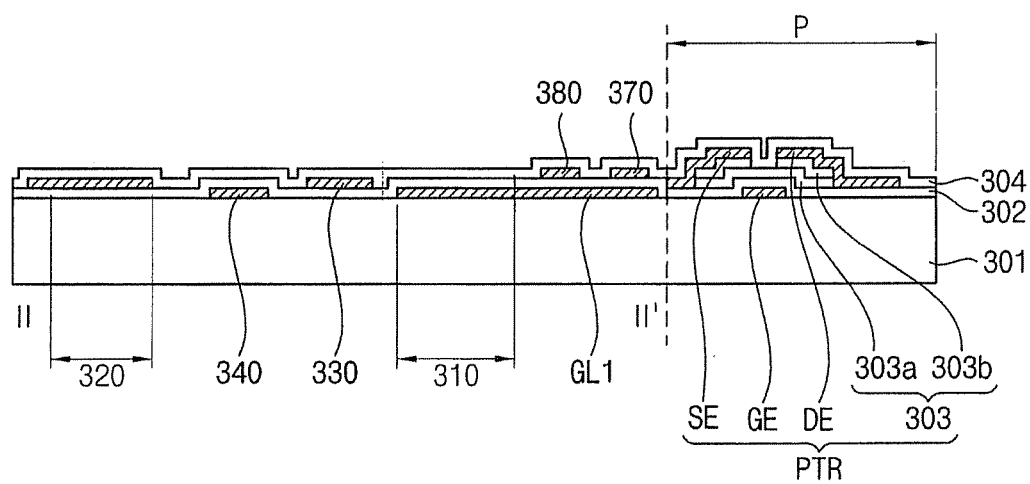
Figure 6C:
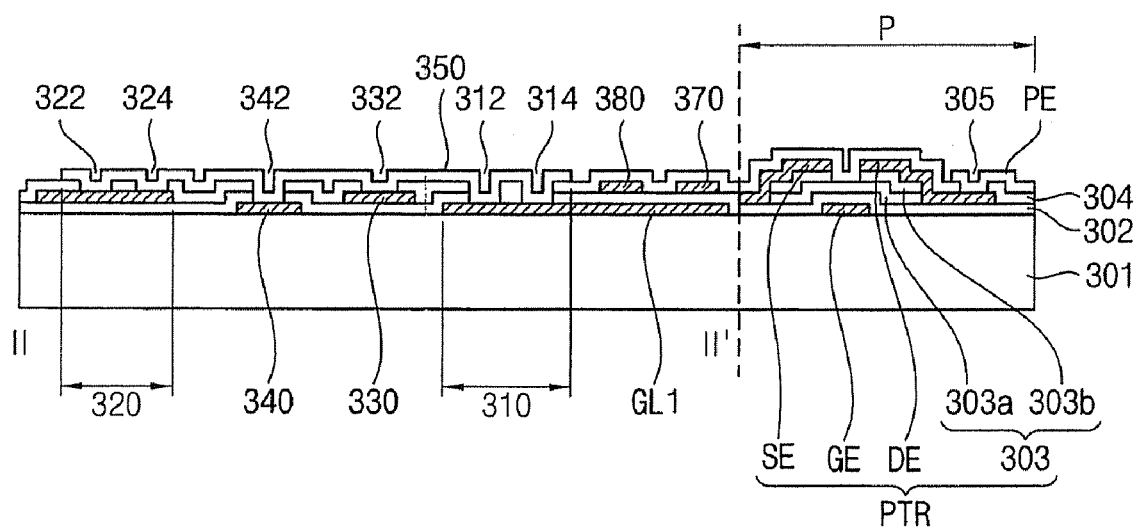

FIGS. 6A, 6B and 6C are cross-sectional views explaining an exemplary embodiment of a method of manufacturing the display substrate of FIG. 5.

Referring FIGS. 5 and 6A, the display substrate 300 includes a base substrate 301. A first metal layer is formed on the base substrate 301, and the first metal layer is patterned to form a first metal pattern. The first metal pattern includes the gate lines GL1 to GLn disposed on the display area DA, the storage lines STL1 to STLn, and a gate electrode GE of a switching element PTR included in the pixel part P. Moreover, the first metal pattern includes the gate pad electrode 310 and a second electrostatic prevention pad electrode 340 that are disposed on the first peripheral area PA1.

A gate insulation layer 302 is formed on the base substrate 301 in which the first metal pattern is formed.

Referring to FIGS. 5 and 6B, a semiconductor layer (not shown) is formed on the base substrate 301 in which the gate insulation layer 302 is formed, and the semiconductor layer is patterned to form an active pattern 303 of the switching element PTR. The active pattern 303 may be configured in a double-layered structure including a lower active layer 303a and an upper ohmic contact layer 303b.

A second metal layer is formed on the base substrate 301 in which the active pattern 303 is formed, and the second metal layer is patterned to form a second metal pattern. The second metal pattern includes the data lines DL1 to DLm disposed on the display area DA, and a source electrode SE and a drain electrode DE of the switching element PTR. Moreover, the second metal pattern includes the output pad electrode 320 and the first electrostatic preventing pad electrode 330 that are disposed on the first peripheral area PA1.

A protection insulation layer 304 is formed on the base substrate 301 in which the second metal pattern is formed.

Referring to FIGS. 5 and 6C, the protection insulation layer 304 is etched to form a contact hole 305 exposing the drain electrode DE of the switching element PTR, contact holes 312 and 314 exposing the gate pad electrode 310, contact holes 322 and 324 exposing the output pad electrode 320, a contact hole 332 exposing the first electrostatic prevention pad electrode 330, and a contact hole 342 exposing the second electrostatic prevention pad electrode 340.

A transparent conductive layer is formed on the base substrate 301 through which the contact holes 305, 312, 314, 322, 324, 332 and 342 are formed, and the transparent conductive layer is patterned to form a transparent electrode pattern. The transparent electrode pattern includes a pixel electrode PE included in the pixel part P, and the connection pad electrode 350.

According to the illustrated exemplary embodiment in FIGS. 5-6C, the pad part 360 has a stepped difference defined by portions of the pad part 360, so that application of electrostatic to the gate driving circuit 306 from the gate lines GL1 to GLn, such as during a test process, may be reduced or effectively prevented.

Moreover, the third electrostatic prevention pad electrode 380 is disposed between the pad part 360 and the storage connection line 370 in the plan view, so that application of the electrostatic to the gate driving circuit 306 from the storage lines STL1 to STLn, such as during a test process, may be reduced or effectively prevented.

Figure 7:
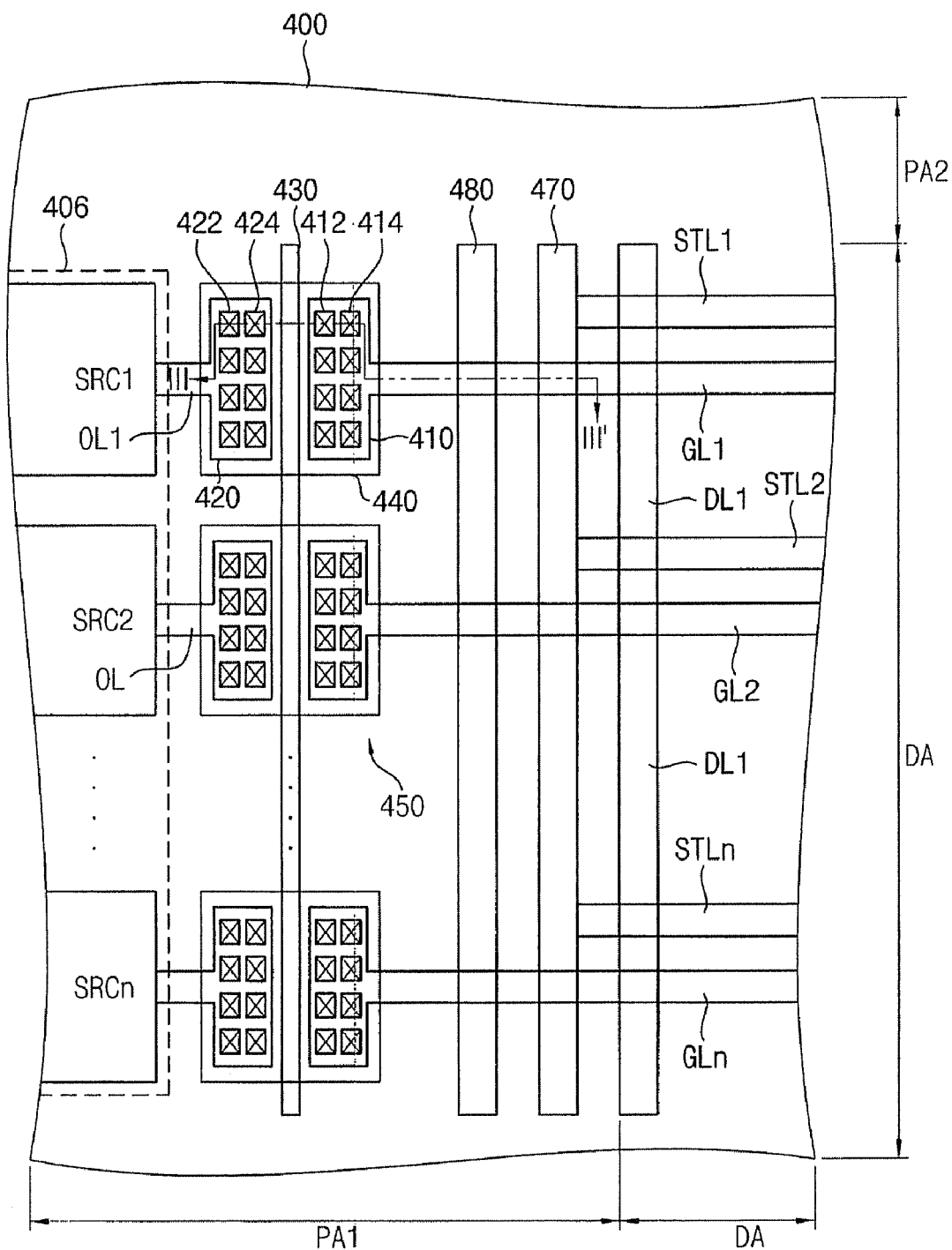
FIG. 7 is a plan view illustrating another exemplary embodiment of a display substrate, according to the invention.

FIG. 7 is a plan view illustrating another exemplary embodiment of a display substrate, according to the invention.

The display substrate 400 according to the exemplary embodiment is substantially the same as the display substrate 300 of FIG. 5 except for at least a configuration of a pad part 450. Thus, identical reference numerals are used in FIG. 7 to refer to components that are the same or like those shown in FIG. 5, and thus a detailed description thereof will be omitted.

Referring to FIG. 7, the display substrate 400 includes a display area DA, a first peripheral area PA1 and a second peripheral area PA2. The first and second peripheral areas PA1 and PA2 surround the display area DA.

A gate driving circuit 406 and a plurality of the pad part 450 are disposed on the first peripheral area PA1. The gate driving circuit 406 includes a plurality of stages SRC1 to SRCn. In this exemplary embodiment, 'n' is a natural number.

The pad part 450 includes a gate pad electrode 410, an output pad electrode 420, a first electrostatic prevention pad electrode 430 and a connection pad electrode 440.

The gate pad electrode 410 is electrically and/or physically connected to first end portions of the gate lines GL1 to GLn that are extended in the first peripheral area PA1.

The output pad electrode 420 is electrically and/or physically connected to an output line OL1 extended from output terminals of each of the stages SRC1 to SRCn.

The first electrostatic prevention pad electrode 430 is disposed between the gate pad electrode 410 and the output pad electrode 420 in the plan view. The first electrostatic prevention pad electrode 430 is disposed in a same layer as the output pad electrode 420. The first electrostatic prevention pad electrode 430 receives a ground voltage. The first electrostatic prevention pad electrode 430 provides a discharging path of electrostatic applied to the gate pad electrode 410, so that application of electrostatic to the gate driving circuit 406 may be reduced or effectively prevented.

The connection pad electrode 440 is disposed to cover (e.g., overlap in the plan view) the gate pad electrode 410, the output pad electrode 420 and the first electrostatic prevention pad electrode 430. The connection pad electrode 440 is electrically and/or physically connected to the gate pad electrode 410 and the output pad electrode 420 through contact holes 412, 414, 422 and 424 extended completely through the gate pad electrode 410 and the output pad electrode 420. The first electrostatic prevention pad electrode 430 is electrically floated from the connection pad electrode 440, that is, the first electrostatic prevention pad electrode 430 and the connection pad electrode 440 include different materials and/or are disposed on different layers.

In the illustrated embodiment of FIG. 7, the first electrostatic prevention pad electrode 430 disposed between the gate pad electrode 410 and the output pad electrode 420 is a single unitary continuous member, connected to multiple pad parts 450. In contrast, in the illustrated embodiment of FIG. 7, an electrostatic prevention pad electrode, e.g., collectively the first electrostatic prevention pad electrode 330 and the second electrostatic prevention pad electrode 340, is disposed between the gate pad electrode 310 and the output pad electrode 320 for each pad part 360. That is where the electrostatic prevention pad electrode in FIG. 7 has a one-to-many relationship with the respective pad parts, the electrostatic prevention pad electrode in FIG. 5 has a one-to-one relationship with the respective pad parts.

The display substrate 400 may include a storage connection line 470 and a second electrostatic prevention pad electrode 480.

The storage connection line 470 is disposed extended in a direction crossing the storage lines STL1 to STLn disposed on the display area DA, and is electrically and/or physically connected to an end portion of the storage lines STL1 to STLn extended in the first peripheral area PA1. The storage connection line 470 delivers a common voltage VCOM to the storage lines STL1 to STLn.

The second electrostatic prevention pad electrode 480 is disposed between the pad parts 450 and the storage connection line 470, in the plan view. The second electrostatic prevention pad electrode 480 is disposed to cross the gate lines GL1 to GLn extended in the first peripheral area PA1, and is electrically floated from the gate lines GL1 to GLn. That is, the second electrostatic prevention pad electrode 480 and the gate lines GL1 to GLn include different materials and/or are disposed on different layers. The second electrostatic prevention pad electrode 480 receives a ground voltage. The second electrostatic prevention pad electrode 480 provides a discharging path of electrostatic applied to the gate lines GL1 to GLn, so that application of the electrostatic to the pad part 450 may be reduced or effectively prevented.

Although not shown in FIG. 7, the display substrate 400 may further include a signal pad part which provides the gate driving circuit 406, the data lines DL1 to DLm and the storage lines STL1 to STLn with driving signals, and an electrostatic protection circuit capable of reducing or effectively preventing electrostatic from being applied to the gate driving circuit 406 and the storage lines STL1 to STLn, as shown in FIG. 1.

Figure 8A:
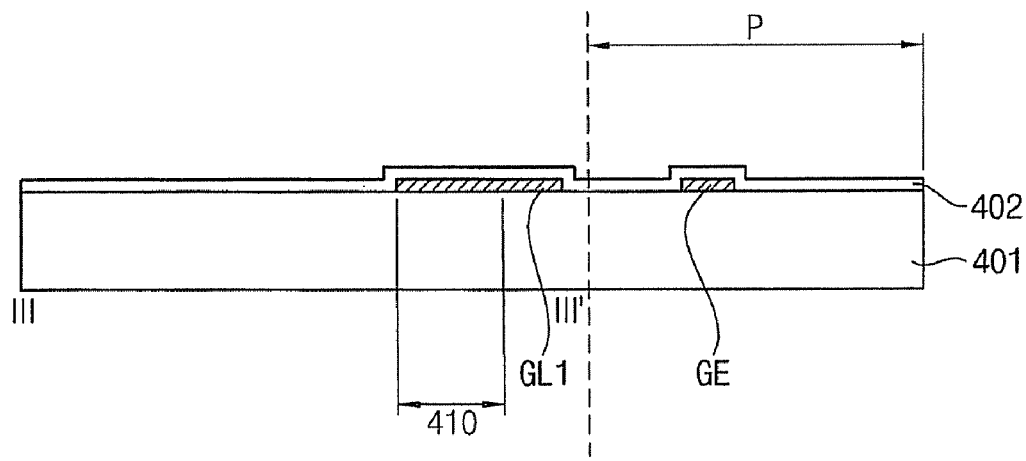
FIGS. 8A, 8B and 8C are cross-sectional views along line III-III' in FIG. 7 and within a pixel part, explaining an exemplary embodiment of a method of manufacturing the display substrate of FIG. 7.
Figure 8B:
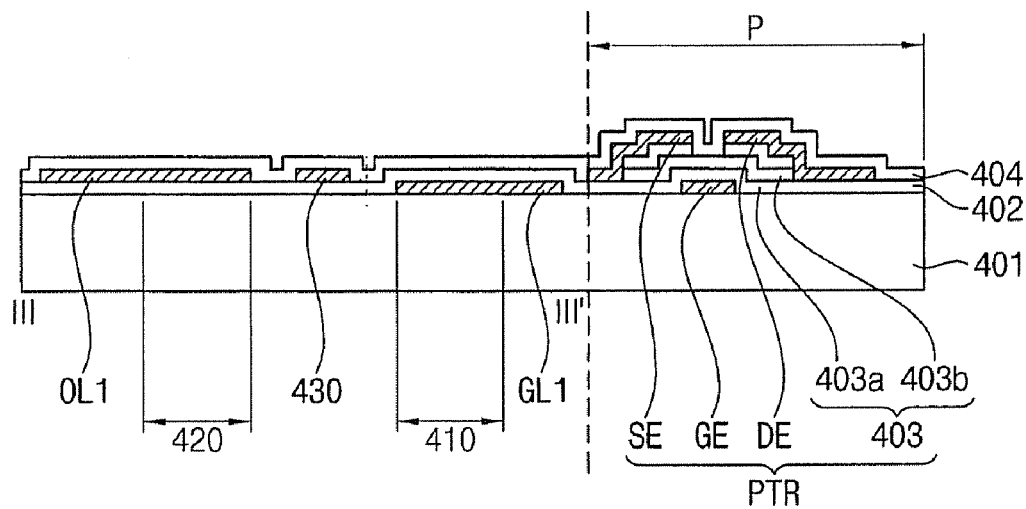
Figure 8C:
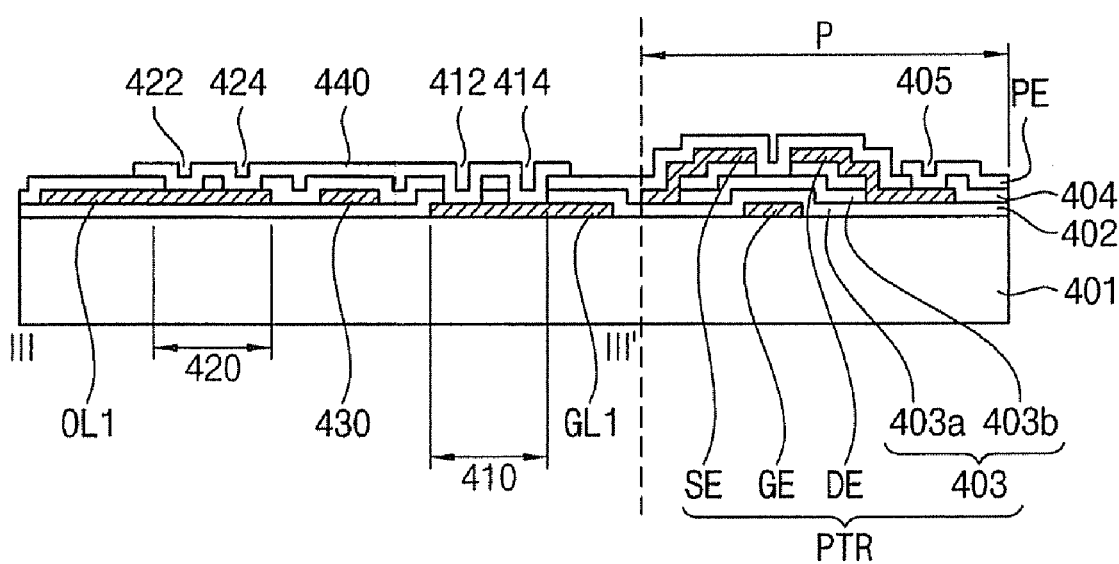

FIGS. 8A, 8B and 8C are cross-sectional views explaining an exemplary embodiment of a method of manufacturing the display substrate of FIG. 7.

Referring FIGS. 7 and 8A, the display substrate 400 includes a base substrate 401. A first metal layer is formed on the base substrate 401, and the first metal layer is patterned to form a first metal pattern. The first metal pattern includes the gate lines GL1 to GLn disposed on the display area DA, the storage lines STL1 to STLn, and a gate electrode GE of a switching element PTR included in the pixel part P. Moreover, the first metal pattern includes the gate pad electrode 410 disposed on the first peripheral area PA1.

A gate insulation layer 402 is formed on the base substrate 401 in which the first metal pattern is formed.

Referring to FIGS. 7 and 8B, a semiconductor layer (not shown) is formed on the base substrate 401 in which the gate insulation layer 402 is formed, and the semiconductor layer is patterned to form an active pattern 403 of the switching element PTR. The active pattern 403 may be configured in a double-layered structure including a lower active layer 403a and an upper ohmic contact layer 403b.

A second metal layer is formed on the base substrate 401 in which the active pattern 403 is formed, and the second metal layer is patterned to form a second metal pattern. The second metal pattern includes a source electrode SE and a drain electrode DE of the switching element PTR formed on the display area DA. Moreover, the second metal pattern includes the output pad electrode 420 and/or physically connected to an output line OL1 of each stage disposed on the first peripheral area PA1, and the electrostatic prevention pad electrode 430 disposed on the first peripheral area PA1.

A protection insulation layer 404 is formed on the base substrate 401 in which the second metal pattern is formed.

Referring to FIGS. 7 and 8C, the protection insulation layer 404 is etched to form a contact hole 405 exposing a drain electrode DE of the switching element PTR, contact holes 412 and 414 exposing the gate pad electrode 410, contact holes 422 and 424 exposing the output pad electrode 420.

A transparent conductive layer is formed on the base substrate 401 through which the contact holes 405, 412, 414, 422 and 424 are formed, and the transparent conductive layer is patterned to form a transparent electrode pattern. The transparent electrode pattern includes a pixel electrode PE included in the pixel part P, and the connection pad electrode 440.

According to the illustrated exemplary embodiment in FIGS. 7-8C, the pad part 450 has a stepped difference defined by portions of the pad part 450, so that application of electrostatic to the gate driving circuit 406 from the gate lines GL1 to GLn, such as during a test process, may be reduced or effectively prevented.

Moreover, the electrostatic prevention pad electrode 430 is disposed between portions of the pad part 450 in the plan view, so that application of the electrostatic to the gate driving circuit 406 from the storage lines STL1 to STLn and/or the gate lines GL1 to GLn, such as during a test process, may be reduced or effectively prevented.

According to the illustrated exemplary embodiment, the electrostatic prevention pad electrode 430 is disposed between the gate pad electrode 410 and the output pad electrode 420, so that it may be prevented electrostatic from being applied to the gate driving circuit 406 from the gate lines GL1 to GLn.

As described above, according to exemplary embodiments of the invention, a gate driving circuit may be prevented from being deteriorated due to electrostatic of a negative polarity (−) and electrostatic of a positive polarity (+) that are generated during a manufacturing process of a display substrate. Thus, a manufacturing yield of an LCD panel may be enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display substrate comprising:
    a base substrate comprising a display area in which a plurality of pixel parts is disposed, and a peripheral area surrounding the display area;
    a plurality of a gate line disposed at the display area and extended to the peripheral area;
    a gate driving circuit disposed at the peripheral area, comprising a plurality of stages connected to the gate lines, and providing the gate lines with gate signals, the gate driving circuit driven in response to a vertical starting signal applied to a first stage of the plurality of stages;
    a starting pad disposed at the peripheral area and applying the vertical starting signal to the gate driving circuit; and
    a first electrostatic dispersion portion electrically connected to the starting pad, the first electrostatic dispersion portion dispersing electrostatic applied to the gate driving circuit.

2. The display substrate of claim 1, further comprising:
    a vertical starting line electrically connected to the starting pad and the first stage, the vertical starting line delivering the vertical starting signal from the starting pad to the first stage of the gate driving circuit; and
    a first electrostatic dispersion line extended in a direction crossing a direction of the vertical starting line, and electrically connected to the first electrostatic dispersion portion.

3. The display substrate of claim 2, wherein the first electrostatic dispersion portion comprises:
    a first electrostatic diode part electrically connected to the vertical starting line and the first electrostatic dispersion line; and
    a second electrostatic diode part electrically connected to the vertical starting line in parallel with the first electrostatic diode part.

4. The display substrate of claim 3, wherein each of the first and second electrostatic diode parts comprises:

a first diode comprising a first control electrode connected to the vertical starting line, a first input electrode connected to the vertical starting line, and a first output electrode spaced apart from the first input electrode and connected to the first electrostatic dispersion line; and a second diode comprising a second control electrode connected to the first electrostatic dispersion line, a second input electrode connected to the vertical starting line, and a second output electrode connected to the first output electrode.

5. The display substrate of claim 2, further comprising:
a plurality of a storage line disposed at the display area, in substantially parallel with the gate lines, and extended to the peripheral area;
a storage connection line disposed at the peripheral area, the storage connection line extended in a direction crossing a direction of the storage lines, and connected to an end portion of the storage lines; and
a second electrostatic dispersion portion disposed at the peripheral area and dispersing electrostatic applied to the storage connection line.

6. The display substrate of claim 5, further comprising:
a second electrostatic dispersion line electrically connected to the second electrostatic dispersion portion; and
a third electrostatic dispersion portion electrically connected to the first and second electrostatic dispersion lines, and dispersing electrostatic applied through the first electrostatic dispersion portion and the second electrostatic dispersion portion.

7. A display substrate comprising:
a base substrate comprising a display area in which a plurality of pixel parts is disposed, and a peripheral area surrounding the display area;
a gate line disposed at the display area and extended to the peripheral area;
a gate driving circuit disposed at the peripheral area, and providing the gate line with a gate signal;
a gate pad electrode disposed at the peripheral area and connected to an end portion of the gate line extended at the peripheral area;
an output pad electrode disposed at the peripheral area and electrically connected to an output terminal of the gate driving circuit; and
a first electrostatic prevention pad electrode in a same layer as the output pad electrode, and disposed between the output pad electrode and the gate pad electrode, the first electrostatic prevention pad dispersing electrostatic applied to the gate line.

8. The display substrate of claim 7, further comprising:
a connection pad electrode disposed overlapping the gate pad electrode, the output pad electrode and the first electrostatic prevention pad electrode, the connection pad electrode electrically connecting the output pad electrode and the gate pad electrode.

9. The display substrate of claim 8, wherein the first electrostatic prevention pad electrode is in a different layer than the connection pad electrode.

10. The display substrate of claim 9, wherein the first electrostatic prevention pad electrode receives a ground voltage.

11. The display substrate of claim 8, further comprising:
a second electrostatic prevention pad electrode disposed between the output pad electrode and the first electrostatic prevention pad electrode, the second electrostatic prevention pad electrode in a same layer as the gate pad electrode.

12. The display substrate of claim 11, wherein the connection pad electrode is electrically connected to the first and second electrostatic prevention pad electrodes.

13. The display substrate of claim 11, further comprising:
a storage line disposed in parallel with the gate line and on the display area;
a storage connection line extended in a direction crossing the storage line on the peripheral area, and connected to an end portion of the storage line; and
a third electrostatic prevention pad electrode extended in a direction crossing the gate line, and disposed between the gate pad electrode and the storage connection line, the third electrostatic prevention pad electrode in a different layer than the gate line.

14. The display substrate of claim 13, wherein the third electrostatic prevention pad electrode receives a ground voltage.

15. A method of manufacturing a display substrate, the method comprising:
forming a first metal pattern comprising:
a gate line in a display area of a base substrate, and
a gate pad electrode in a peripheral area surrounding the display area, the gate pad electrode connected to a first end portion of the gate line;
forming a second metal pattern comprising:
a data line in the display area of the base substrate in which the first metal pattern is formed,
an output pad electrode connected to an output terminal of a gate driving circuit formed on the peripheral area, and
a first electrostatic prevention pad electrode formed between the output pad electrode and the gate pad electrode; and
forming a transparent electrode pattern comprising a pixel electrode electrically connected to the gate line and the data line on the base substrate in which the second metal pattern is formed.

16. The method of claim 15, wherein the forming a transparent electrode pattern comprises:
forming a connection pad electrode overlapping the gate pad electrode, the output pad electrode and the first electrostatic prevention pad electrode on the base substrate in which the second metal pattern is formed, the connection pad electrode electrically connecting the gate pad electrode and the output pad electrode.

17. The method of claim 16, wherein the first electrostatic prevention pad electrode is in a different layer than the connection pad electrode.

18. The method of claim 15, wherein the forming a first metal pattern comprises:
forming a second electrostatic prevention pad electrode between the output pad electrode and the first electrostatic prevention pad electrode.

19. The method of claim 18, wherein the forming a transparent electrode pattern comprises:
forming a connection pad electrode overlapping the gate pad electrode, the output pad electrode and the first and second electrostatic prevention pad electrodes on the base substrate in which the second metal pattern is formed, the connection pad electrode electrically connecting the gate pad electrode, the output pad electrode and the first and second electrostatic prevention pad electrodes.

20. The method of claim 19, wherein the forming a second metal pattern comprises:
forming a storage connection line at the peripheral area and extended in a direction crossing a direction of storage lines formed on the display area, the storage connection line connecting end portions of the storage lines to each other, and forming a third electrostatic prevention pad electrode extended in a direction crossing the gate line, disposed between the gate pad electrode and the storage connection line, and disposed in a different layer than the gate line.

* * * * *